United States Patent Office 3,322,786
Patented May 30, 1967

3,322,786
3-INDOLYL ALIPHATIC ACIDS
Meyer Sletzinger, North Plainfield, and Raymond A. Firestone, Fanwood, N.J., assignors to Merck & Co., Inc., Rahway, N.J., a corporation of New Jersey
No Drawing. Filed Oct. 7, 1965, Ser. No. 493,885
6 Claims. (Cl. 260—326.12)

This invention relates to a novel process for preparing α(3-indolyl) lower aliphatic carboxylic acids. It also relates to novel indolyl diesters.

The process of this invention, according to certain of its aspects, provides a novel route to α-(3-indolyl) lower aliphatic acids, which may be substituted or unsubstituted. When substituted, the substituents may be located on the benzenoid ring of the indole structure, on the nitrogen atom of the indole structure, or on other substituents, typically acyl substituents which are in turn bonded to the nitrogen atom. The substituents which may be present are selected from a very broad class, subject to the requirements that (i) they be inert to the chemical processes employed or be amenable to chemical protection, and (ii) that strongly deactivating or electron attracting groups not be present on the benzenoid ring of the indole structure.

Illustrative compounds which can be prepared by the process of this invention are those represented by the formula

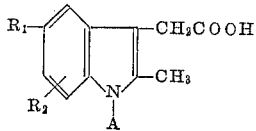

wherein
A is hydrogen or a substituted or unsubstituted carbocyclic or heterocyclic acyl radical preferably an aromatic acyl radical which contains less than 3 fused rings;
$R_1$ is hydrogen, lower alkyl, lower alkoxy, haloalkyl, halogen, hydroxyl, mercapto, benzylmercapto, benzyloxy, cyclic lower alkyl, cyclic lower alkoxy, lower dialkylamino, bis (hydroxy lower alkyl) amino, pyrrolidino, morpholino, piperazino, lower alkenyl; and
$R_2$ is hydrogen, lower alkyl, lower alkoxy or halogen.

The process of this invention for preparing α-(2-methyl-3-indolyl) acetic acids comprises the steps of condensing an aniline with the labile diester of γ-halo-β ketoadipic acid, thereby forming the corresponding indole-2,3-diacetate; cleaving the said indole-2,3-diacetate to the corresponding indole-2,3-diacetic acid; and decarboxylating the said indole-2,3-diacetic acid thereby forming an α-(2-methyl-3-indolyl) acetic acid.

In accordance with the process of this invention, α-(2-methyl-3-indolyl) acetic acids are prepared from an aniline. The anilines which may be employed are aniline per se and substituted derivatives thereof wherein the substituents are inert, i.e. they are not reactive toward the reagents employed under the process conditions, and are non-deactivating, i.e. not electron attracting when bonded directly to a benzene ring. Deactivating substituents are characterized by their tendency to deactivate the ortho and para positions of the benzene ring and are therefore generally categorized as meta-directing substituents. The substituents which can be present on the aniline ring in accordance with this invention are those defined as ortho, para-directing substituents.

The anilines which are useful in this invention are those having at least one position ortho to the amino group free of substituents. They may have no more than one substituent ortho to the amino group. Preferably, both ortho positions will be unsubstituted. Where there is an ortho substituent, it will preferably be a non-hindering substituent, i.e. one which does not have sufficient bulk to interfere with substituents bonded to the adjacent carbon.

The preferred anilines are those having the structure

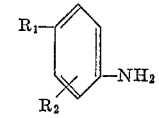

wherein $R_1$ and $R_2$ have the meanings hereinbefore set forth. Most preferably $R_2$ will be hydrogen and the aniline will be substituted only in the para position. Illustrative preferred anilines include p-anisidine, o-anisidine, m-anisidine, p-toluidine, o-toluidine, m-toluidine, p-chloroaniline, p-fluoroaniline, p-bromoaniline, o-fluoroaniline, m-fluoroaniline, p-trifluoromethylaniline, p-ethoxyaniline, p-n-propoxyaniline, p-aminophenol, p-benzlimercaptoaniline, p-benzyloxyaniline, m-cyclohexylaniline, p-ccyclohexoxyaniline, p-dimethylaminoaniline, p-aminothiophenol, p-bis(β-hydroxyethyl) aminoaniline, p-1-pyrrolidinoaniline, p-1-piperazinoaniline, p-1-morpholino-aniline, etc.

The aniline is condensed with a labile diester of γ-halo-β-ketoadipic acid. The diesters which are employed are preferably those having the structure $$R_3OOCCH_2(X)C(O)CH_2COOR_3$$

wherein X is halogen, preferably bromine, and $R_3$ is a bulky labile group derived from the alcohol $R_3OH$. The labile, bulky groups employed are those which are highly susceptible to non-aqueous cleavage to produce the free acid. The preferred labile, bulky group is t-butyl. Illustrative preferred diesters include di(t-butyl)-β-keto-γ-bromoadipate; di-(t-butyl)-β-keto-γ-chloroadipate; etc.

The condensation of the aniline with the γ-halo-β-ketoadipic acid diester can be represented by the equation:

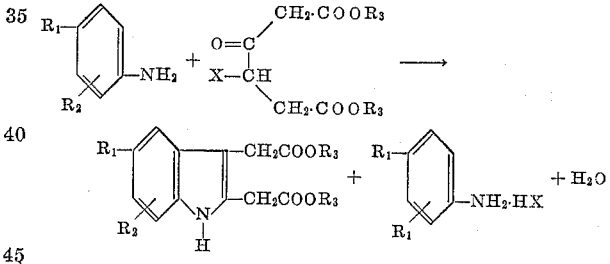

Typically, the condensation is carried out in the presence of an acid catalyst, preferably a hydrogen halide such as hydrogen chloride or hydrogen bromide, and with an excess of the aniline, i.e. at least two moles of aniline per mole of adipate. The excess aniline can serve as solvent for the reaction. Alternatively, an inert organic solvent may also be employed. It should have a boiling point high enough to permit removal of the water of reaction by distillation. Inert solvents which can be used include hydrocarbons, ethers, halogenated hydrocarbons, etc. The reaction is preferably run at a temperature which is high enough to drive off the water formed. Temperatures of about 100–200° C. are suitable. Lower temperatures may be employed when there is present an inert solvent which forms a low boiling azeotrope with water.

Condensation reactions of this type typically produce two indole isomers of the hetero ring wherein the 2- and 3- substituents are reversed with respect to each other. These isomers will be identical only if the 2- and 3- substituents are identical. However, the indole derivatives of greatest utility are those wherein the 2- and 3-substituents are different. Conventional syntheses would therefore generally lead to mixtures of the two possible isomers which would require separation. It is a particular advantage of this invention that it provides a route to ultimate indole derivatives having different substituents at the 2- and 3-positions but which are obtained from intermediates wherein the 2- and 3-substituents are identical. Because of this identity in the intermediate, the two isomers produced in the condensation are identical with respect to 2,3-substitution and it is not necessary to perform a difficult and laborious isomer separation.

Isomerism can also occur in the benzenoid ring due to the fact that the hetero ring closure may take place at either position ortho to the nitrogen atom. If one of the ortho positions is blocked by a substituent, ring closure can take place in only one direction and only one isomer will be formed. If the starting aniline is substituted only in the para position, the two isomers formed will be identical and only one product will be formed. However, when the starting aniline bears one meta substituent, two isomers will be formed, viz. a 4-substituted indole and a 6-substituted indole. If there are two identical meta substituents on the starting aniline, ring closure will produce 2 identical isomers, both being 4,6-disubstituted indoles. Where there are two different meta substituents, two different isomers will be obtained.

The condensation of the aniline with the labile adipate diester yields the labile diester of the corresponding indole-2,3-diacetic acid. In accordance with the process of this invention, the labile diester is cleaved to produce the corresponding diacid according to the following equation, wherein the labile group $R_3$ is t-butyl.

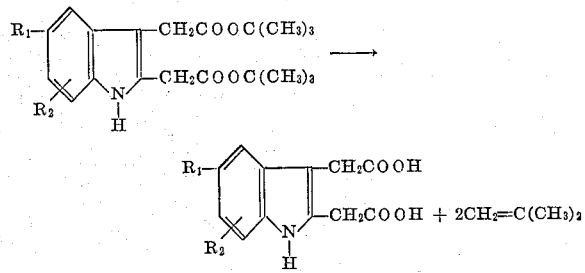

The cleavage of the labile diester is carried out under non-aqueous conditions, preferably by pyrolysis. Cleavage may be effected with or without the presence of a high-boiling inert solvent, e.g. toluene, xylene, etc. Cleavage catalysts, including strong acids such as p-toluenesulfonic acid or other organic sulfonic acid are preferably employed. Where such a catalyst is used, cleavage is effected at low temperatures, say 25° C. to 110° C. When no catalyst is present, the cleavage reaction is conducted at a temperature of at least about 210° C. Preferably, an inert atmosphere such as nitrogen is maintained during the reaction.

The diacid formed in the cleavage reaction is unstable and spontaneously decarboxylates under the reaction conditions according to the equation

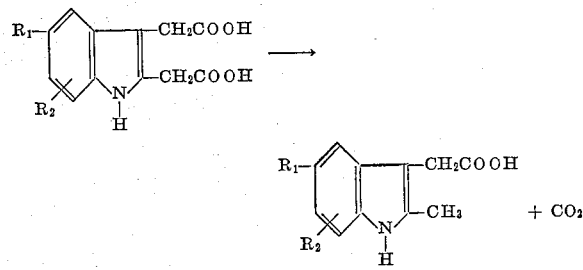

In practice, the diacid is not recovered and the product isolated is the 2-methyl compound.

The process of this invention is useful for preparing 1-acyl indoles having therapeutic utility. The 1-acyl substituent can be a carbocyclic or heterocyclic acyl radical, preferably an aromatic acyl radical which contains less than 3 fused rings. The substituent may be introduced at any point after the condensation of the aniline with the adipate diester. It may be introduced into the 2,3-diester indole or the 2-methyl compound. Preferably, the compound acylated will be the indole-2,3-diacetate prepared by condensing the aniline with the adipate diester.

The acyl radical can be a carbocyclic or heterocyclic radical and preferably an aromatic acyl radical containing less than three fused rings. These acyl groups may be further substituted in the aromatic ring with hydrocarbon groups or with functional substituents. Thus, suitable aroyl substituents are the benzoyl, phenylbenzoyl and naphthoyl groups. The rings of such groups may contain, and in the preferred compounds do contain, at least one functional substituent. This substituent may be a hydroxy or an etherified hydroxy (hydrocarbonoxy) group such as a lower alkoxy, e.g., methoxy, ethoxy, isopropoxy, propoxy, an alkenyloxy such allyloxy, an aryloxy or aralkoxy group, e.g., phenoxy, benzyloxy, halobenzyloxy, lower alkoxybenzyloxy and the like. In may be a nitro radical, a halogen such as chlorine, bromine, iodine or fluorine, an amino group or a substituted amino group, representative examples of which include acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and arylthio or aralkylthio groups, e.g., benzylthio and phenylthio. The N-1 aroyl radical may, if desired, be haloalkylated, as with a trifluoromethyl, trifluoroethyl, perfluoroethyl, β-chloroethyl, or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the N-1 aroyl radical is benzoyl and the functional substituent is in the para position of the six-membered ring, e.g. p-chlorobenzoyl and p-methylthiobenzoyl.

The 1-acyl radical may be introduced by reacting the corresponding 1-hydrogen compound with alkali metal hydride to form the 1-sodium salt and intimately contacting the salt with the desired acid halide according to the equation:

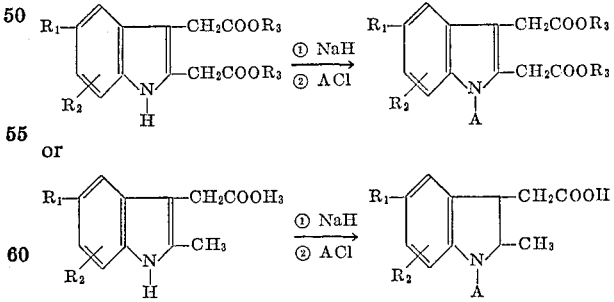

wherein $R_2$, $R_3$ and $R_4$ have the definitions hereinbefore set forth and A is an acyl radical of the type described above. The acylation reaction proceeds smoothly at substantially room temperature. Temperatures from about 0° C. to about 100° C. are generally suitable. Preferably, the reaction is carried out in the presence of an inert diluent or solvent, such as dimethylformamide, benzene, toluene, xylene, or mixtures thereof. Stoichiometric quantities of the reactants are generally sufficient but small excesses, say up to about 10% excess, sodium hydride or acyl halide may be employed. For convenience in handling, the sodium hydride is preferably used in the form of a dispersion in an inert dispersant such as mineral oil. The acylated products are recovered and purified by standard techniques.

In place of the acyl halide, there may be used a phenolic ester of the acyl group, particularly a p-nitrophenyl ester, or the anhydride, azide or thiophenolic ester.

The α-(1-aroyl or heteroaroyl-3-indolyl)-lower aliphatic acid compounds which can be prepared according to this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, these compounds have a useful degree of antipyretic and analgesic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 10–2000 mg. per day are useful in control of arthritic conditions, depending on the activity of the specific compound and the reaction sensitivity of the patient.

The novel intermediates of this invention are di-t-butyl indole-2,3-diacetates wherein the N–1 substituent is hydrogen or a carbocyclic or heterocyclic acyl radical. They have utility in the preparation of anti-inflammatory indole compounds. The preferred novel intermediates are those having the formula

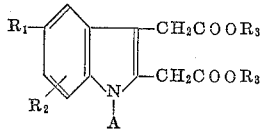

wherein

A is hydrogen or a carbocyclic or heterocyclic acyl radical, preferably an aromatic carbocyclic or heterocyclic acyl radical containing less than three fused rings;

$R_1$ is hydrogen, lower alkyl, lower alkoxy, haloalkyl, halogen, hydroxyl, mercapto, benzylmercapto, benzyloxy, cyclic lower alkyl, cyclic lower alkoxy, lower dialkylamino, bis (lower hydroxyalkyl) amino, pyrrolidino, morpholino, piperazino, lower alkenyl;

$R_2$ is hydrogen, lower alkyl, lower alkoxy or halogen; and $R_3$ is a bulky, labile group, preferably t-butyl.

The following examples are provided to illustrate the practice of this invention. It will be understood that the invention is not limited to the specific embodiments described but encompasses all modifications and variations which fall within its general scope.

*Example 1.—Di-t-butyl 5-methoxyindole-2,3-diacetate*

A mixture of 2.46 g. p-anisidine (0.02 mole) and 3.51 g. di-t-butyl 3-keto-4-bromo adipate is heated to about 140° C. with stirring under nitrogen whereupon reaction sets in, and water is distilled out. After ten minutes, the mixture is cooled and stirred with 25 ml. ether and 25 ml. 1 N HCl. The ether layer then is separated, washed with successive 5 ml. portions of 1 N HCl, water and saturated aqueous sodium bicarbonate, dried, and evaporated. The residue is almost pure di-t-butyl 5-methoxyindole-2,3-diacetate.

In place of the p-anisidine of this example, there is substituted o-anisidine, m-anisidine, p-toluidine, o-toluidine, m-toluidine, p-chloroaniline, p-fluoroaniline, p-bromoaniline, o-fluoroaniline, m-fluoroaniline, p-tri-fluoromethylaniline, p-ethoxyaniline, p-n-propoxyaniline, p-aminophenol, p-benzylmercaptoaniline, p-benzyloxyaniline, m-cyclohexylaniline, p-cyclohexylaniline, p-dimethylaminoaniline, p - aminothiophenol, p - bis(β - hydroxyethyl) aminoaniline, p-1-pyrrolidinoaniline, p-1-piperazinoaniline, p-1-morpholinoaniline, p-aminostyrene, 2,4-dimethoxyaniline, 2,4-dimethylaniline, 2,4-diethylaniline, 2,4-dichloroaniline, 2-methyl-4-methoxyaniline, 2-methyl-4-chloroaniline, 3,5-dimethylaniline, and 3-methyl-5-methoxyaniline, to produce: di-t-butyl-7-methoxyindole-2,3-diacetate; di-t-butyl-4- and 6-methoxyindole-2,3-diacetate; di-t-butyl 5-methylindole-2,3-diacetate; di-t-butyl-7-methylindole -2,3-diacetate; di-t-butyl 4 and 6-methylindole-2,3-diacetate; di-t-butyl 5-chloroindole-2,3-diacetate; di-t-butyl 5-fluoroindole-2,3-diacetate; di-t-butyl 5-bromoindole-2,3-diacetate; di-t-butyl 7-fluoroindole-2,3-diacetate; di-t-butyl 4 and 6-fluoroindole-2,3-diacetate; di-t-butyl 5-trifluoromethylindole-2,3-diacetate; di-t-butyl 5-ethoxyindole - 2,3-diacetate; di-t-butyl 5-n-propoxyindole-2,3-diacetate; di-t-butyl 5-hydroxyindole-2,3-diacetate; di-t-butyl 5-benzylthioindole-2,3-diacetate; di-t-butyl 5-benzyloxyindole-2,3-diacetate; di-t-butyl 4 and 6-cyclohexylindole-2,3-diacetate; di-t-butyl 5-cyclohexylindole-2,3-diacetate; di-t-butyl 5-dimethylaminoindole-2,3-diacetate; di-t-butyl 5-mercaptoindole-2,3-diacetate; di-t-butyl 5-[bis(hydroxyethyl)amino] indole-2,3 - diacetate; di-t-butyl 5-(1-pyrrolidino)indole-2,3-diacetate; di-t-butyl 5-(1-piperazino) indole-2,3-diacetate; di-t-butyl 5-(1-morpholino)indole-2,3-diacetate; di-t-butyl 5-vinylindole-2,3-diacetate; di-t-butyl 5,7-dimethoxyindole-2,3-diacetate; di-t-butyl 5,7-dimethoxyindole-2,3-diacetate; di-t-butyl 5,7-diethylindole - 2,3-diacetate; di-t-butyl 5,7-dichloroindole-2,3-diacetate; di-t-butyl 5-methoxy-7-methylindole-2,3-diacetate; di-t-butyl 5-chloro-7-methylindole-2,3-diacetate; di-t-butyl 4,6-dimethylindole-2,3-diacetate; di-t-butyl 4 and 6-methyl-4 and 6-methoxyindole-2,3-diacetate.

*Example 2.—Di-t-butyl 1-(p-methylthiobenzoyl)-5-methoxyindole-2,3-diacetate*

The di-t-butyl 5-methoxyindole-2,3-diacetate of Example 1 is added to a mixture of 2.5 g. of 51% sodium hydride-mineral oil emulsion in 240 ml. of dimethylformamide. The resulting mixture is stirred at room temperature for 30 minutes and then a solution of 8.75 g. of p-methylthiobenzoyl chloride in 50 ml. of dimethylformamide is added slowly over a 40-minute period. The mixture is then stirred in an ice-bath for four hours under nitrogen. It is then poured into a mixture of ether, acetic acid and water. Following the work-up procedure and using a 200 g. column of alumina for the chromatography step, and eluting with a mixture of 1:1 benzene petroleum ether, di-t-butyl 1-(p-methylthiobenzoyl)-5-methoxyindole-2,3-diacetate is obtained.

When the p-methylthiobenzoyl chloride of Example 2 is replaced by an equivalent amount of p-chlorobenzoyl chloride; 2,4-dichlorobenzoyl chloride; benzoyl chloride; naphthoyl chloride; p-fluorobenzoyl chloride; p-methylaminobenzoyl chloride; p-difluoromethoxybenzoyl chloride; p-bromobenzoyl chloride; p-nitrobenzoyl chloride; o-chlorobenzoyl chloride; m-chlorobenzoyl chloride; p-acetoxybenzoyl chloride; p-benzyloxybenzoyl chloride; p-trifluoromethylbenzoyl chloride; 2,6-dimethoxybenzoyl chloride; p-phenoxybenzoyl chloride; 4-thiazole carbonyl chloride; 1-methylindazole-3-carbonyl chloride; 4-oxazole carbonyl chloride; 1-methylimidazole-5-carbonyl chloride; N,N-dimethyl-p-sulfonamide-benzoyl chloride; and 2-benzylmercaptothiazole-4-carbonyl chloride, the corresponding di-t-butyl 1-acyl-5-methoxyindole-2,3-diacetates are obtained.

Following the procedure of Example 2, the 1-hydrogen indole diacetates of Example 1 are substituted for the di-t-butyl 5-methoxyindole-2,3-diacetate and the corresponding 1-(p-methylthiobenzoyl) indoles are obtained. In a similar manner, the 1-hydrogen indole diacetates of Example 1 are reacted with any of the above acyl halides to produce the corresponding 1-acyl indole diacetates.

Example 3.—α-[1-(p-methylthiobenzoyl)-2-methyl-5-methoxy-3-indolyl] acetic acid One gram of the di-t-butyl 1-p-methylthiobenzoyl-5-methoxyindole-2,3-diacetate of Example 2 is dispersed in 10 cc. of anhydrous toluene and 0.1 gram of p-toluenesulfonic acid is added. The reaction mixture is heated to about 75° C., whereupon isobutylene and carbon dioxide are evolved. The mixture is maintained between 72 and 78° C. for about 3 hours until the evolution of gas ceases. It is then cooled and filtered and extracted with aqueous bicarbonate. The aqueous solution is separated, filtered, neutralized with dilute acetic acid and weakly acidified with dilute hydrochloric acid, whereupon α-[1-(p-methylthiobenzoyl)-2-methyl-5-methoxy-3-indolyl] acetic acid is precipitated. The product is purified by recrystallization from aqueous ethanol.

Following the procedure of Example 3, the di-t-butyl 1-acylindole-2,3-diacetates of Example 2 are cleaved and decarboxylated to the corresponding 2-methylindole-3-acetic acids.

Example 4.—α-(2-methyl-5-methoxy-3-indolyl) acetic acid

One gram of the di-t-butyl 5-methoxyindole-2,3-diacetate of Example 1 is dispersed in 10 cc. of anhydrous toluene and 0.1 gram of p-toluenesulfonic acid is added thereto. The reaction mixture is heated to 35° C. whereupon isobutylene and carbon dioxide are evolved. The reaction mixture is maintained at 32 to 35° C. for 2 hours until the gas evolution ceases. It is then cooled and extracted with aqueous bicarbonate. The aqueous extract is filtered, neutralized with acetic acid and weakly acidified with dilute hydrochloric acid, whereupon α-(2-methyl-5-methoxy-3-indolyl) acetic acid precipitates.

When the di-t-butyl 5-methoxyindole-2,3-diacetate of this example is replaced by the di-t-butyl indole-2,3-diacetates of Example 1, the corresponding α-(2-methyl-3-indolyl) acetic acids are obtained.

Example 5.—α-[1-(p-methylthiobenzoyl)-2-methyl-5-methoxy-3-indolyl] acetic acid One gram of di-t-butyl 1-p-methylthiobenzoyl-5-methoxyindole-2,3-diacetate is mixed with 0.1 g. of powdered porous plate and the mixture is heated in an oil bath at 210° C. with magnetic stirring under a blanket of nitrogen for about 2 hours. After cooling under nitrogen, the product is dissolved in benzene and ether, filtered, and extracted with bicarbonate. The aqueous solution is filtered with suction to remove ether, neutralized with acetic acid, and then acidified weakly with dilute hydrochloric acid, whereupon α-[1-(p-methylthiobenzoyl)-2-methyl-5-methoxy-3-indolyl] acetic acid precipitates.

Example 6.—α-[1-(p-chlorobenzoyl)-2-methyl-5-methoxy-3-indolyl] acetic acid 4.6 grams of the α-(2-methyl-5-methoxy-3-indolyl) acetic acid of Example 4 is added to a mixture of 1.5 grams of 51% sodium hydride-mineral oil emulsion in 150 ml. of dimethylformamide. The resulting mixture is stirred at room temperature for 30 minutes, after which a solution of 5 grams of p-chlorobenzoyl chloride in 30 ml. of dimethylformamide is slowly added over a 40-minute period. The mixture is then stirred in an ice-bath for four hours under nitrogen. It is poured into a mixture of ether, acetic acid and water. The product is worked-up and chromatographed on a 200 g. column of alumina, eluting with a 1:1 benzenepetroleum ether mixture.

The product obtained is α-[1-(p-chlorobenzoyl)-2-methyl-5-methoxy-3-indolyl] acetic acid.

When the α-(2-methyl-3-indolyl) acetic acids of Example 4 are substituted for the α-(2-methyl-5-methoxy-3-indolyl) acetic acid of this example, the corresponding 1-p-chlorobenzoyl compounds are obtained. When p-chlorobenzoyl chloride is replaced by the acyl halides of Example 2, the corresponding 1-acylindoles are obtained. Similarly, the acyl halides of Example 2 are reacted with the α-(2-methyl-3-indolyl) acetic acids of Example 5 to produce a series of α-(1-acyl-2-methyl-3-indolyl) acetic acids.

Example 7.—Di-t-butyl 5-(1-pyrrolidino) indole-2,3-diacetate

A mixture of 6.5 g. (0.04 mole) of p-(1-pyrrolidino) aniline and 3.07 g. di-t-butyl 3-keto-4-chloroadipate is heated to about 180° C. with stirring under nitrogen. Water distills off during the reaction. After about 10 minutes, the mixture is cooled and stirred with 50 ml. ether and 50 ml. 1 N HCl. The ether layer is then separated, washed with successive 5 ml. portions of 1 N HCl, water and saturated sodium bicarbonate, dried and evaporated. The residue is almost pure di-t-butyl 5-(1-pyrrolidino) indole-2,3-diacetate.

Example 8.—Di-t-butyl 1-(p-chlorobenzoyl)-5-(1-pyrrolidino)indole-2,3-diacetate The di-t-butyl-5-(1-pyrrolidino) indole-2,3-diacetate of Example 7 is added to a mixture of 5 g. of 51% sodium-hydride-mineral oil emulsion in 240 ml. of dimethylformamide. The resulting mixture is stirred at room temperature for 30 minutes and then heated to about 60° C. A solution of 16.5 g. of p-chlorobenzoyl chloride is added slowly over a 90-minute period and the mixture is stirred for an additional hour at 60° C. It is then cooled and poured into a mixture of ether, acetic acid and water. After working-up, the product is chromatographed on a 200 g. alumina column using 1:1 benzene-petroleum ether as the eluant to give di-t-butyl 1-(p-chlorobenzoyl)-5-(1-pyrrolidino)-indole-2,3-diacetate.

Example 9.—α-[-1-(p-chlorobenzoyl)-2-methyl-5-(1-pyrrolidino)-3-indolyl] acetic acid Two grams of di-t-butyl 1-(p-chlorobenzoyl)-5-(1-pyrrolidino) indole-2,3-diacetate are dispersed in 25 cc. of anhydrous xylene and 0.1 grams of p-toluenesulfonic acid are added. The reaction mixture is heated to 85° C. whereupon isobutylene and carbon dioxide are evolved. It is maintained between 80 and 87° C. for about 2.5 hours until gas evolution ceases. It is then cooled and filtered and extracted with aqueous bicarbonate. The aqueous solution is separated, filtered, neutralized with dilute acetic acid and weakly acidified with dilute hydrochloric acid whereupon α-[1-(p-chlorobenzoyl) - 2 - methyl-5-(1-pyrrolidino)-3-indolyl] acetic acid precipitates.

What is claimed is:
1. A novel compound of the formula

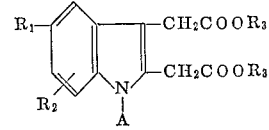

wherein

A is selected from the group consisting of benzoyl, substituted benzoyl wherein said substitutent is selected from the group consisting of N,N-dilower alkylsulfonamido, halo, lower alkylamino, nitro, lower alkylthio, lower alkanoyloxy, benzyloxy, trifluoromethyl, lower alkoxy and phenoxy; naphthoyl, thiazole carbonyl, oxazole carbonyl, 1-methylimidazole carbonyl and 2-benzylmercaptothiazole carbonyl;

$R_1$ is selected from the group consisting of hydrogen, lower alkyl, lower alkoxy, halo, trifluoromethyl, amino, benzylmercapto, benzyloxy, cyclohexyl, di(lower alkyl) amino, bis(β-hydroxy lower alkyl)amino, 1-pyrrolidino, 1-piperazino, 1-morpholino, lower alkenyl, hydroxy and mercapto;

$R_2$ is selected from the group consisting of hydrogen, lower alkyl, lower alkoxy cyclohexyl, and halogen; and $R_3$ is t-butyl.

2. A compound of the formula

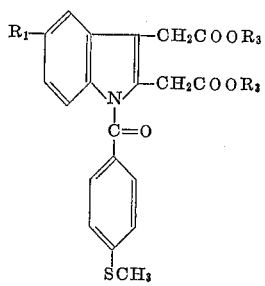

wherein $R_1$ is lower alkoxy and $R_3$ is t-butyl.

3. A compound of the formula

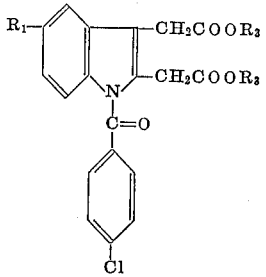

wherein $R_1$ is lower alkoxy and $R_3$ is t-butyl.

4. A compound of the formula

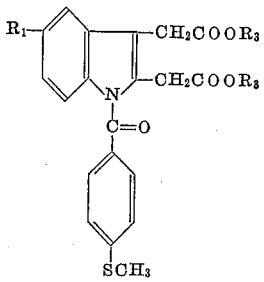

wherein $R_1$ is lower alkyl and $R_3$ is t-butyl.

5. A compound of the formula

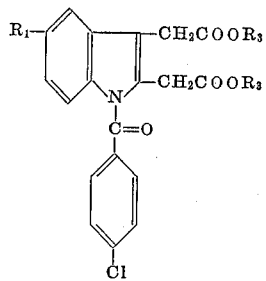

wherein $R_1$ is lower alkyl and $R_3$ is T-butyl.

6. A compound of the formula

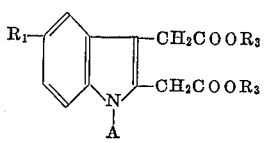

wherein

A is selected from the group consisting of p-chlorobenzoyl and p-methylthiobenzoyl;
$R_1$ is selected from the group consisting of lower alkoxy, lower alkyl, and di(lower alkyl) amino; and
$R_3$ is t-butyl.

References Cited

Elderfield: Heterocyclic Compounds, vol. 3, New York, John Wiley & Sons, Inc., 1952, pages 22–23.

Findlay et al.: Jour. Org. Chem., 1948, volume 13, pages 560–568.

ALEX MAZEL, *Primary Examiner.*

MARY U. O'BRIEN, *Assistant Examiner.*